United States Patent
Schoenberg

(10) Patent No.: US 10,223,149 B2
(45) Date of Patent: Mar. 5, 2019

(54) IMPLEMENTING DEVICE MODELS FOR VIRTUAL MACHINES WITH RECONFIGURABLE HARDWARE

(71) Applicant: INTEL CORPORATION, Santa Clara, CA (US)

(72) Inventor: Sebastian Schoenberg, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/380,793

(22) Filed: Dec. 15, 2016

(65) Prior Publication Data

US 2018/0173548 A1 Jun. 21, 2018

(51) Int. Cl.
G06F 9/455 (2018.01)
G06F 13/42 (2006.01)

(52) U.S. Cl.
CPC ...... *G06F 9/45558* (2013.01); *G06F 13/4221* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,060,592 B1 * | 11/2011 | Watsen | H04L 41/085 709/223 |
| 9,483,291 B1 | 11/2016 | Chen et al. | |
| 2008/0228971 A1 | 9/2008 | Rothman et al. | |
| 2010/0262722 A1 * | 10/2010 | Vauthier | G06F 3/14 710/8 |
| 2010/0275205 A1 * | 10/2010 | Nakajima | G06F 9/45558 718/1 |
| 2014/0032948 A1 * | 1/2014 | Kanigicherla | G06F 13/126 713/320 |
| 2014/0201481 A1 * | 7/2014 | Marulkar | G06F 21/80 711/162 |
| 2015/0089495 A1 | 3/2015 | Persson et al. | |
| 2015/0220354 A1 * | 8/2015 | Nair | G06F 13/28 710/301 |

FOREIGN PATENT DOCUMENTS

EP 3089035 11/2016

OTHER PUBLICATIONS

Wikipedia, The Free Encylopedia, "Memory-mapped I/O," 4 pages, https://en.wikipedia.org/w/index.php?title=Memory-mapped_I/O &oldid=754153107, retrieved Dec. 11, 2016.
Wikipedia, The Free Encylopedia, "HBA registers.jpg," 2 pages, http://wiki.osdev.org/File:HBA_registers.jpg, retrieved Dec. 15, 2016.
Extended European Search Report for EP Application No. EP17201906. 9, 13 pages, dated Apr. 13, 2018.

* cited by examiner

*Primary Examiner* — Dong U Kim
(74) *Attorney, Agent, or Firm* — Lowenstein Sandler LLP

(57) ABSTRACT

A processor includes an interface coupled to a programmable integrated circuit (IC) and a processor core coupled to the interface and to execute a virtual machine monitor (VMM). The VMM provides a virtual device for a virtual machine (VM). The virtual device emulates a hardware interface of a hardware device, wherein the processor core is further to execute the VM to transmit a command through the interface to the programmable IC to update a device model, stored in the programmable IC, for the virtual device.

18 Claims, 13 Drawing Sheets

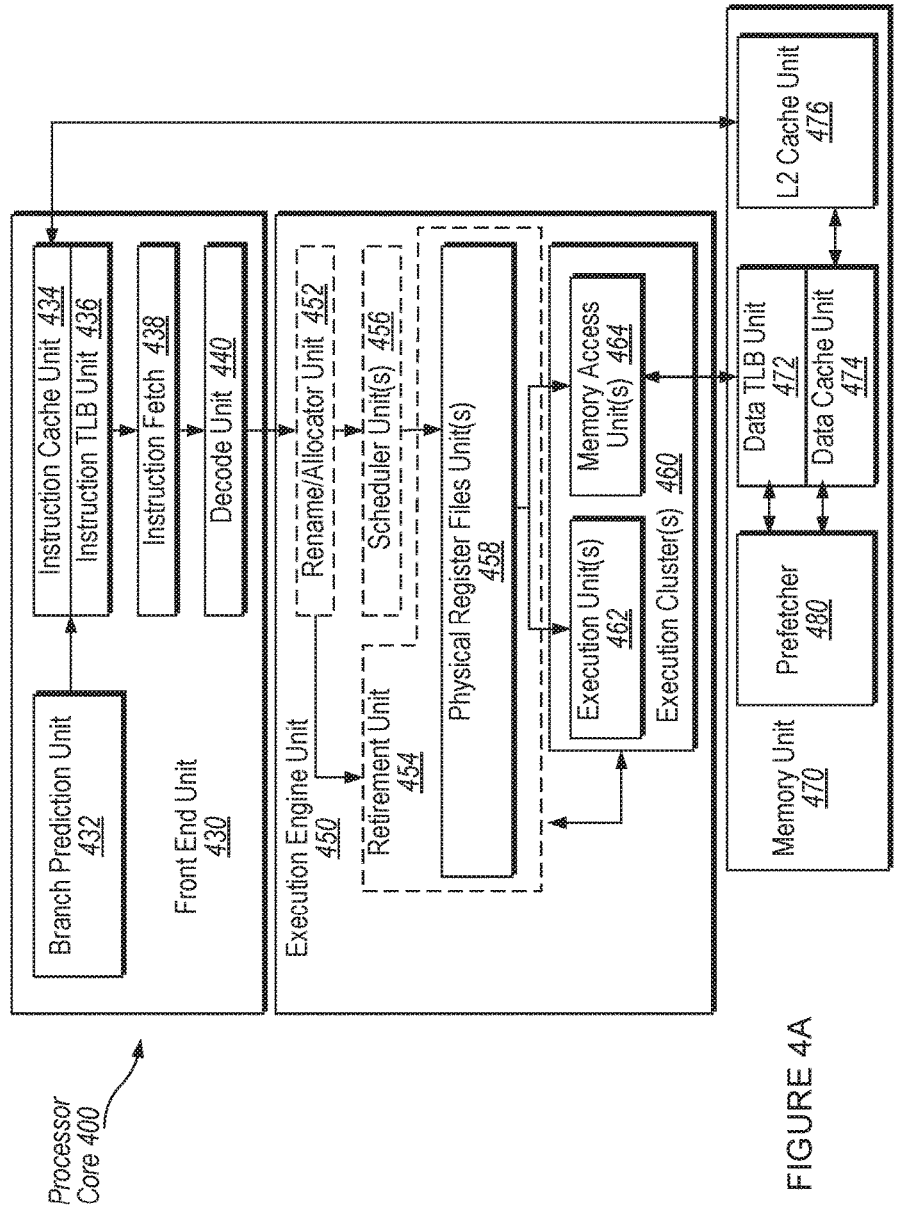

IMPLEMENTING DEVICE MODELS FOR VIRTUAL MACHINES WITH RECONFIGURABLE HARDWARE

The present disclosure relates to the field of virtual machines and, in particular, to implementing device models for virtual machines with reconfigurable hardware.

BACKGROUND

A component of a virtualization-software stack is the virtual machine manager (VMM) (or a hypervisor) that hosts guest virtual machines and multiplexes their requests to hardware devices located within an underlying host environment. The host environment could be an operating system or a run-time environment with device drivers for a physical platform. To emulate a hardware device as a virtual device, the VMM models the hardware interface of the hardware device (or for a complimentary hardware device), which may be performed with state machine logic in the VMM software and is referred to herein as a "device model." As the virtual machine (VM) may need to exit to the VMM often to update the device model and (sometimes) communicate with the hardware interface, a processor core executing the VMM and the VM may undergo numerous transitions between the VMM and the VM, causing associated delays and becoming a costly drain on processing resources.

BRIEF DESCRIPTION OF THE DRAWINGS

FIG. 4A is a block diagram illustrating an in-order pipeline and a register renaming stage, out-of-order issue/execution pipeline according to one embodiment.

FIG. 4B is a block diagram illustrating a micro-architecture for a processor that implements a device model for a virtual machine with reconfigurable hardware.

DESCRIPTION OF EMBODIMENTS

Figure 1A:
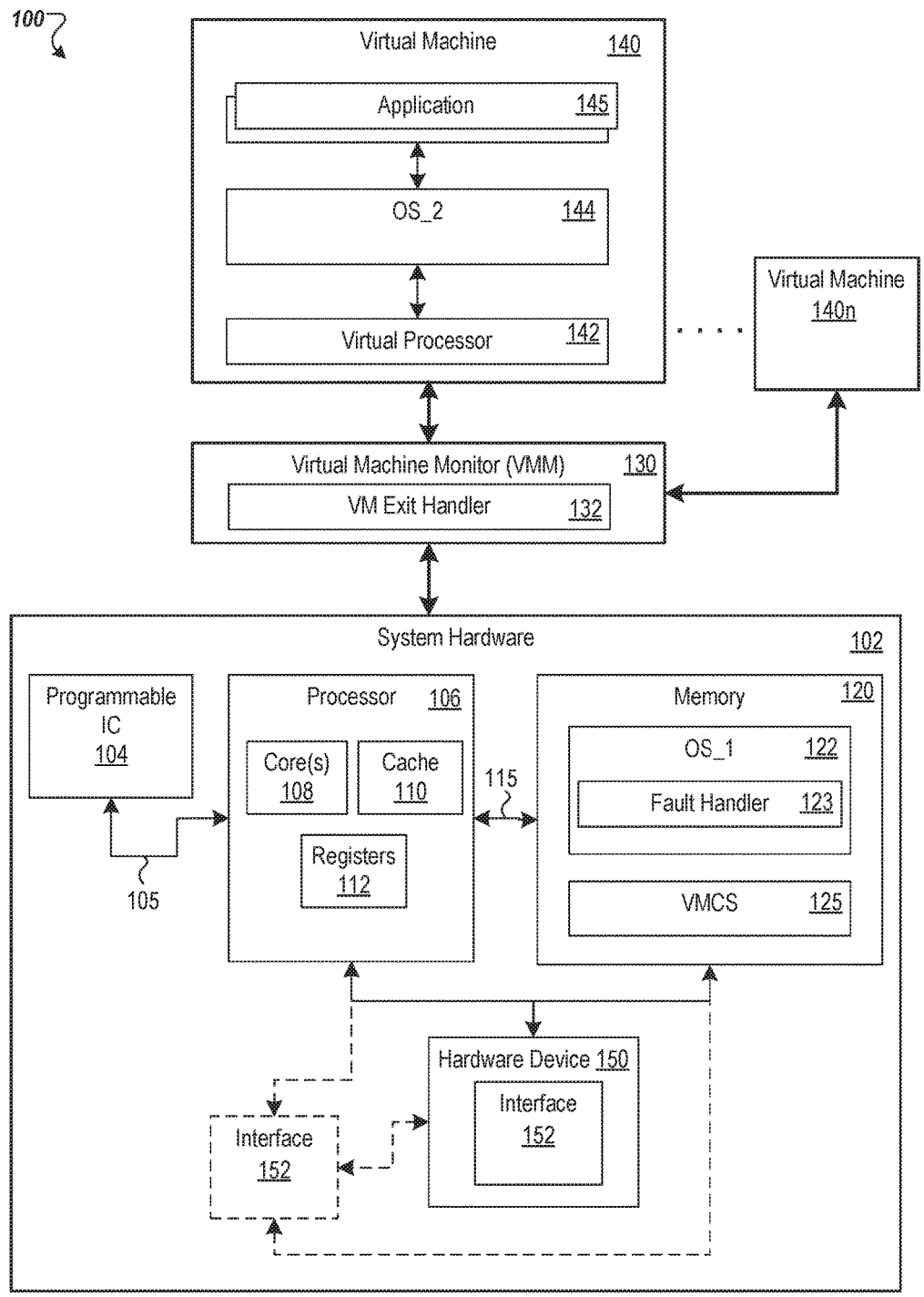
FIG. 1A is a block diagram of a computing device that may execute a virtual machine monitor (VMM) and one or more virtual machines, which interact with a programmable integrated circuit (IC) according to an embodiment of the present disclosure.

When a virtualized operating system, for example that implements a virtual machine (VM), communicates with a hardware device of a host physical platform, a virtual machine manager (VMM) running a top that host physical platform may keep track of commands and data sent back and forth by updating a VMM device model that emulates a hardware device. Generally this means that the VMM device model emulates a hardware interface of the hardware device. Implementation of the VMM device model may also be referred to as a virtual device. In one embodiment, the VMM may implement the VMM device model with a software-based state machine that is updated based on interactions between the VM and the hardware device.

In one embodiment, if an interaction is with the real hardware interface, the VMM may invoke the underlying host physical platform to communicate directly with the hardware interface that the VMM device model emulates. Before such an interaction, however, the VMM may need to send several parameters and commands to the hardware device. In just one example, a write of a block to a Serial AT Attachment (SATA) disk requires a number of sectors, the sector address on the disk, and other parameters to be sent to a memory controller (e.g., a hardware interface) before finalizing a write command to be sent. The SATA disk in this example fetches data referred to in the write command from the host's memory and writes the data to the SATA disk. Furthermore, a status register may need to be polled to check that the SATA device really accepts the write command.

In a virtualized environment, each communication with the hardware device (such as a port access or access to a memory-mapped 10 address) causes an interaction with the VMM, and thus a costly transition from the VM to the VMM, which produces delays and takes up processing resources of one or more processing cores executing the VM and the VMM. While software techniques such as Enlightenment or Paravirtualization may be used to reduce the number of transitions, these techniques require new drivers for the operating system (OS) that runs in the VM. Support for legacy device drivers, however, is normally a design feature of virtualization.

Accordingly, the present disclosure provides for a way to reduce the overhead of constant VM exits to and entries from the VMM for updating a VMM device model for emulated hardware interfaces, while avoiding software solutions that lack support for legacy device drivers. The reduction in overhead may be effected by creating a duplicate device model on a programmable integrated circuit (IC) such as a Field-Programmable Gate Array (FPGA), a programmable Application-Specific Integrated Circuit (ASIC), or other programmable fabric that may or may not exist on the same chip as a processor. Routine updates of the device model during VM access to, for example, ports or memory-mapped I/O address of the virtual device may therefore be made with access to hardware, the programmable IC. Additionally, the VMM may retrieve (or receive) parameters and other data of the device model from the programmable IC when needed to interact with the hardware interface of the hardware device in the host physical platform.

Implementing the device model in reconfigurable hardware such as an FPGA, for example, provides a real performance advantage over a pure software device virtualization because of the reduction of costly VM-to-VMM transitions and the time to execute operations by a processor core. Because the interaction with the programmable IC does not need to be intercepted by software and is executed in hardware, latency of the operation is much lower. Furthermore, the de-parallelization of hardware operations in virtualization (due to serial VM exits and entries) may be reversed through replacement of updating the VMM device model (in software) with updating a device model in a programmable IC, providing further processing efficiency in virtualization.

Especially for frequent operations with real-time demand (e.g., execution has to happen within a certain number of cycles), implementing device models in a programmable IC may provide an option to perform such functionality in virtualized systems, such as providing new usages such as using virtualization to isolate components in verified and certified embedded control systems. Formal verification is more common in programmable IC development than in software development. For example, FPGSs may be hardware implementations of algorithms, and hardware is faster than software executed by one or more processors. An FPGA may also be more deterministic than software, where latencies in FPGAs may be an order of magnitude less than that of graphical processing units or central processing units (e.g., hundreds of nanoseconds versus a few microseconds (or more)). Accordingly, a programmable IC such as an FPGA may be better for applications (such as performed by a VMM) that are to deterministically verify or certify features of an embedded control system. Furthermore, the flexibility of reconfiguring hardware of a programmable IC to implement variable numbers and types of devices is an advantage over implementing device models in solid-state hardware such as a chip set, where the latter provides less flexibility and causes a concomitant increase in chip set size. The instantiation of device models is also flexible in number and type, and may be expanded to device models yet to be developed.

FIG. 1A is a block diagram of a computing device 100 that may execute a virtual machine monitor (VMM) 130 (which may include a VM exit handler 132) and one or more virtual machines 140 . . . 140n, each of which may interface with a programmable integrated circuit (IC) 104 through an interconnect 105, according to an embodiment of the present disclosure. In various embodiments, a "computing device" may be or include, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In one embodiment, the computing device 100 may include system hardware 102 of a host physical platform. The system hardware 102 may include, for example, the programmable IC 104, a processor 106, memory 120, and one or more a hardware device 150. The processor 106 may include one or more cores 108, cache 110, and a number of registers 112. The memory 120 may store an image of an operating system 122 (which may include a fault handler 123), and a virtual machine control structure (VMCS) 125 that the VMM 130 uses to create, control, and manage the virtual machines 140 and 140A. The VMCS 125 may store values into, and retrieve values from, at least some of the registers 112. The fault handler 123 may handle any number of faults that result from the image of the operating system running on the processor 106. For example, these faults may include a segment not present (#NP), a stack-segment fault (#SS), a general protection fault (#GP), or a page fault (#PF), as just a few examples. The system hardware 102 may further include a system bus 115 (which may also be a memory bus) between the processor 106 and the memory 120. In one embodiment, the system bus 115 also functions as the interconnect 105 with the programmable IC 104.

The hardware device 150 may be any integrated hardware device, I/O device, or other peripheral device, examples of which are disclosed herein. The hardware device 150, for example, may be a SATA device, a non-volatile disk drive, a graphics card, a network card, a communication switch or hub, or other data input or output device. The hardware device 150 may further include or be coupled to a hardware interface 152 that is used to communicate with the system hardware 102 (and any software running on the system hardware) for access to the hardware device 150. In the example where the hardware device 150 is a SATA disk, the hardware interface 152 may be an Advance Host Controller Interface (AHCI) or an AHCI controller, e.g., a host bus adapter (HBA) by Intel® of Santa Clara, Calif.

The programmable IC 104 may be a Field-Programmable Gate Array (FPGA), a configurable processor, or other programmable ASIC. The programmable IC 104 may be coupled to the processor 106 through the interconnect 105, which may be a Peripheral Component Interconnect (PCI) bus, a QuickPath Interconnect (QPI) by Intel®, or some other bus. The programmable IC 104, furthermore, may be instantiated as a dual in-line memory module (DIMM) or other memory device. The programmable IC 104 may store the device model of a virtual machine so that most interactions and updates to a virtual device is by way of updating the device model stored in the programmable IC hardware, as will be explained in more detail with reference to FIG. 1B.

Each virtual machine 140 . . . 140n may include a virtual processor 142 that is emulated by underlying system hardware 102, an operating system 144, and one or more applications 145 that the operating system 144 executes. The VMM 130 is a software layer responsible for creating, controlling, and managing the virtual machines. The VMM may be executed on the system hardware 102 supporting the virtual-machine extension (VMX) or similar architecture. The VMM 130 has full control of the processor(s) and other platform hardware of the system hardware 102. The VMM presents guest software (e.g., a virtual machine) with an abstraction of the virtual processor 142 and allows the virtual processor 142 to execute on the processor 106. A VMM 130 is able to retain selective control of processor resources, physical memory, interrupt management, and I/O hardware devices.

Each virtual machine 140 is a guest software environment that supports a stack including the operating system 144 and application software. Each VM may operate independently of other virtual machines and uses the same interface to processor(s), memory, storage, graphics, and I/O provided by a physical platform. The software stack acts as if the software stack were running on a platform with no VMM. Software executing in a virtual machine operates with reduced privilege or its original privilege level such that the VMM can retain control of platform resources per a design of the VMM or a policy that governs the VMM, for example.

The VMM 130 may begin the VMX root mode of operation when the processor 106 executes a VMXON instruction. The VMM starts guest execution by invoking a VM entry instruction. The VMM invokes a VMLAUNCH instruction for execution for a first VM entry of a virtual machine. The VMM invokes a VMRESUME for execution for subsequent VM entries of that virtual machine. The VMLAUNCH or VMRESUME instructions do a VM entry to the virtual machine associated with a current VMCS 125.

During execution of a virtual machine 140, various operations or events (e.g., hardware interrupts, software interrupts, exceptions, task switches, and certain VMX instructions) may cause a VM exit to the VMM 130, after which the VMM regains control. VM exits transfer control to an entry point specified by the VMM, e.g., a host instruction pointer. The VMM may take action appropriate to the cause of the VM exit and may then return to the virtual machine using a VM entry. The VMM can also leave the VMX root mode of operation by executing a VMXOFF operation.

These transitions of a VM entry and a VM exit are controlled by the VMCS 125 data structure stored in the memory 120. The processor 106 controls access to the VMCS 125 through a component of processor state called the VMCS pointer (one per virtual processor) that is setup by the VMM using the VMPTRLD instruction. The VMM may configure a VMCS using VMREAD, VMWRITE, and VMCLEAR instructions. A VMM may use a different VMCS for each virtual processor that it supports. For a virtual machine with multiple virtual processors 142, the VMM 130 could use a different VMCS 125 for each virtual processor.

Figure 1B:
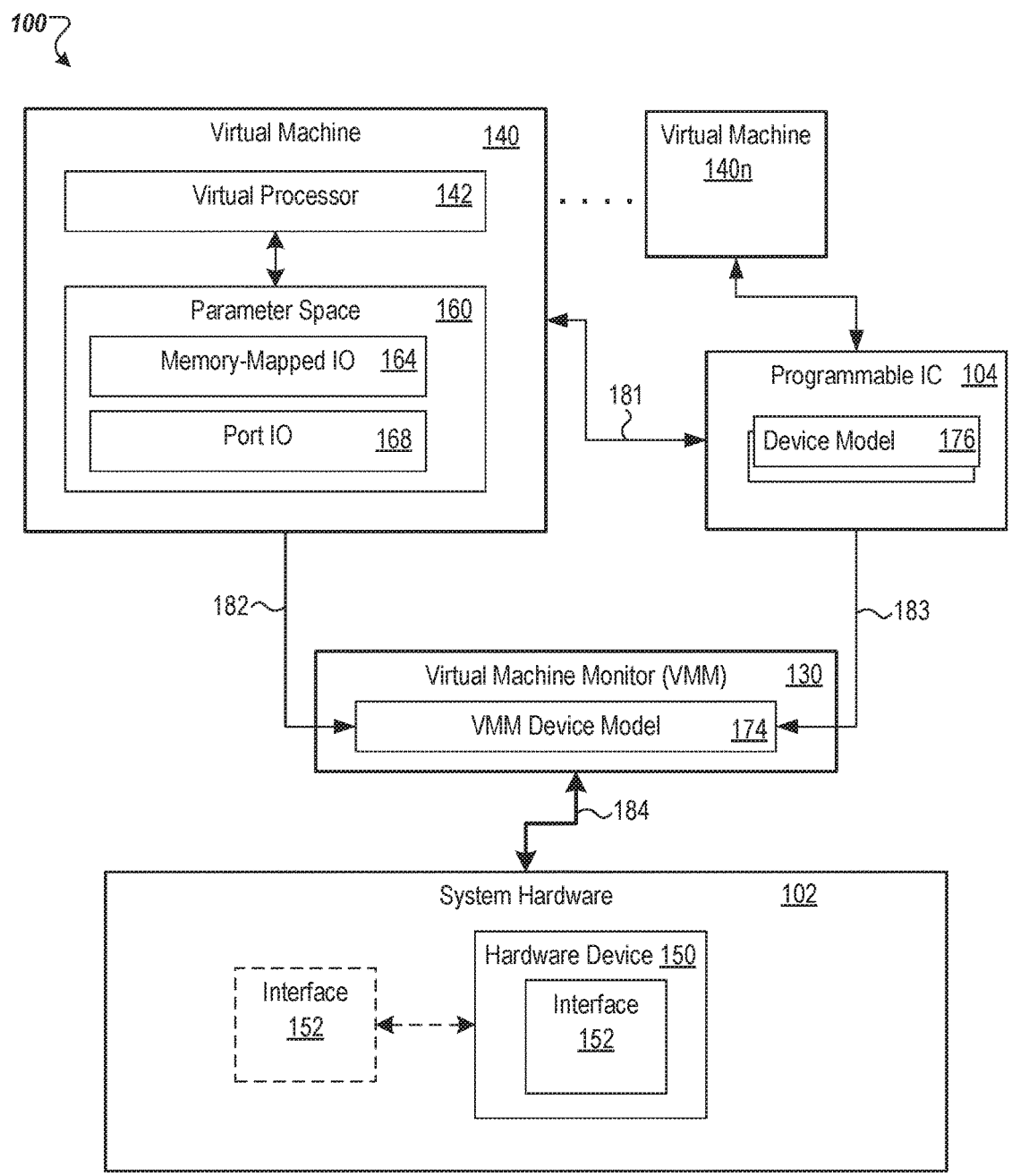
FIG. 1B is a block diagram of an additional view of a virtual machine, the VMM, and the programmable IC of FIG. 1A, according to an embodiment of the present disclosure.

With additional reference to FIG. 1B, the VMM 130, the virtual machine 140, and the programmable IC 104 of FIG. 1A are illustrated in additional detail. The virtual machine 140 (and any of the virtual machines through VM 140n) may further include a parameter space 160 that includes parameters for memory-mapped IO 164 and for port IO 168, for example, among other parameters needed to interface with the hardware interface 152 of the hardware device 150.

Memory-mapped I/O (MMIO) and port-mapped I/O (PMIO) (which is also called isolated I/O) are two complementary methods of performing I/O between the processor 106 and peripheral devices (such as the hardware device 150 in some cases) of the computing device 100. Memory-mapped I/O uses the same address bus to address both memory and I/O devices, where the memory and registers of the I/O devices are mapped to (associated with) address values. So, when the processor 106 accesses an address, the address may refer to a portion of physical RAM, but may also refer to memory of the I/O device. Thus, the processor's instructions used to access the memory can also be used for accessing devices. Each I/O device monitors the CPU's address bus and responds to any CPU access of an address assigned to that device, connecting the data bus to the desired device's hardware register. To accommodate the I/O devices, areas of the addresses used by the CPU are reserved for I/O and may not be available for normal physical memory. The reservation may be permanent or temporary.

Port-mapped I/O (or PIO) often uses a special class of processor instructions designed specifically for performing I/O, such as the in and out instructions found on microprocessors based on the x86 and x86-64 architectures. Different forms of these two instructions can copy one, two or four bytes (outb, outw and outl, respectively) between the EAX register or one of that register's subdivisions on the processor and a specified I/O port that is assigned to an I/O device. I/O devices have a separate address space from general memory, either accomplished by an extra "I/O" pin on the processor's physical interface, or an entire bus dedicated to I/O. Because the address space for I/O is isolated from that for main memory, this is sometimes referred to as isolated I/O.

As mentioned, the virtual machine 140 may connect to the hardware device 150 to send commands to the hardware interface 152, and thus to direct the hardware device 150. To do so, the VMM 130 may emulate one or more instructions (such as device driver instructions) to provide the virtual machine 140 access to the hardware interface 152. For example, in a virtualized environment, each communication with the hardware device (such as a port access or access to a memory-mapped IO address) causes an interaction with the VMM, and thus a costly transition from the VM to the VMM, which produces delays and takes up processing resources of the processing core(s) 108 and the memory 120. The VMM 130 may track such interactions with the hardware interface 152 by making updates to a VMM device model 174 stored in the memory 120. The interactions may include, for example, virtual I/O operations that set up a real I/O operation such as a disk read or a disk write or sending a network packet from a network card.

The VMM device model 174 for the virtual device may keep track of all such interactions until the VMM 130 executes a hardware-based operation, e.g., writing a block of memory to disk or sending the network packet. In many cases, setup operations-related I/O just retain a value written in an internal memory structure (such as the memory 120), and thus changes the control state of the virtual device. These aspects of the VMM device models 174 are typically of low complexity, and thus may instead be implemented as a device model 176 in the programmable IC 104 or other configurable hardware.

A typical FPGA, for example, may host hundreds of instances of states machines (or other logic) that are used to implement virtual devices. Accordingly, I/O operations to ports on the hardware interface 152 may be passed straight to the device model 176 of the programmable IC 104. When an interaction between the hardware interface 152 and the VMM 130 becomes necessary (e.g., to send a write command to a storage disk), the device model 176 may send a request to the VMM 130 to execute the interaction, where the request includes parameters and other data that the VMM 130 may need to complete the hardware-based interaction. The VMM 130 may then complete the hardware-based interaction, e.g., by sending a write command to port on a SATA disk or triggering the issuance of a network packet from a network card (among a multitude of other hardware-based interactions with a hardware device 150).

FIG. 1B also labels interactions between the various components as follows:

between the virtual machine 140 and the programmable IC 104 (181); between the virtual machine and the VMM 130 (182); between the programmable IC 104 and the VMM 130 (183); and between the VMM 130 and the hardware device 150 (184). To send a command to a port or other component of the hardware interface 152, there are at least two options (where "a port" is referred to for exemplary purposes, e.g., in the case of a SATA device):

As a first option, the virtual machine 140 may issue a command to the port, and the command is captured and handled by the VMM device model 174 (182). The VMM 130 may retrieve all previously captured parameters (and, optionally, other data) from the device model 176 of the programmable IC needed to complete the command to the hardware interface 152 (183). In one example, the VMM may also populate the VMM device model 174 with these parameters (and data) in preparation for interaction with the hardware interface 152. The VMM 130 may then execute a translated operation directed to the port of the hardware interface 152 using the parameters (and/or data) retrieved from device model 176 of the programmable IC (184).

As a second option, the virtual machine 140 may issue a command to the port, and the command is captured and handled by the device model 176 of the programmable IC (181). In this case, the programmable IC 104, executing the device model 176, may detect the command and transmit a request to the VMM 130 that includes parameters or data that the VMM 130 needs to complete an interaction with the hardware interface 152 (183). The programmable IC may create the request as a descriptor file and populate the descriptor file with the parameters and data being transmitted to the VMM in the request. In one example, the VMM may also populate the VMM device model 174 with these parameters (and data) in preparation for interaction with the hardware interface 152. The VMM 130 may then execute a translated operation directed to the port of the hardware interface 152 using the parameters (and/or data) received from the device model 176 of the programmable IC 104 (184).

By way of example, and for purposes of explanation, the hardware interface 152 that the VMM 130 emulates (as a virtual device) may be a hardware interface such as an Advance Host Controller Interface (AHCI) or an AHCI controller by Intel® of Santa Clara, Calif., designed to facilitate handling SATA devices. The AHCI specification emphasizes that an AHCI controller (referred to as host bus adapter, or HBA) is designed to be a data movement engine between the system memory 120 and SATA devices. The AHCI specification encapsulates SATA devices and provides a standard PCI interface to the host, e.g., to the computing device 100. System designers can access SATA drives using system memory and memory-mapped registers, without the need for manipulating task files as in an Integrated Drive Electronics (IDE)-based interface. The VMM 130 may, however, also emulate an IDE-based interface as a virtual device as well.

An AHCI controller may support up to 32 ports which can attach different SATA devices such as disk drives, port multipliers, or an enclosure management bridge. AHCI supports native SATA features such as command queuing, hot plugging, power management, etc. To a software developer, an AHCI controller may appear as a PCI device with bus master capability. FIGS. 2 and 3 disclose the hardware registers and memory structures of the AHCI controller that the VMM 130 would emulate in the present example.

Figure 2A:
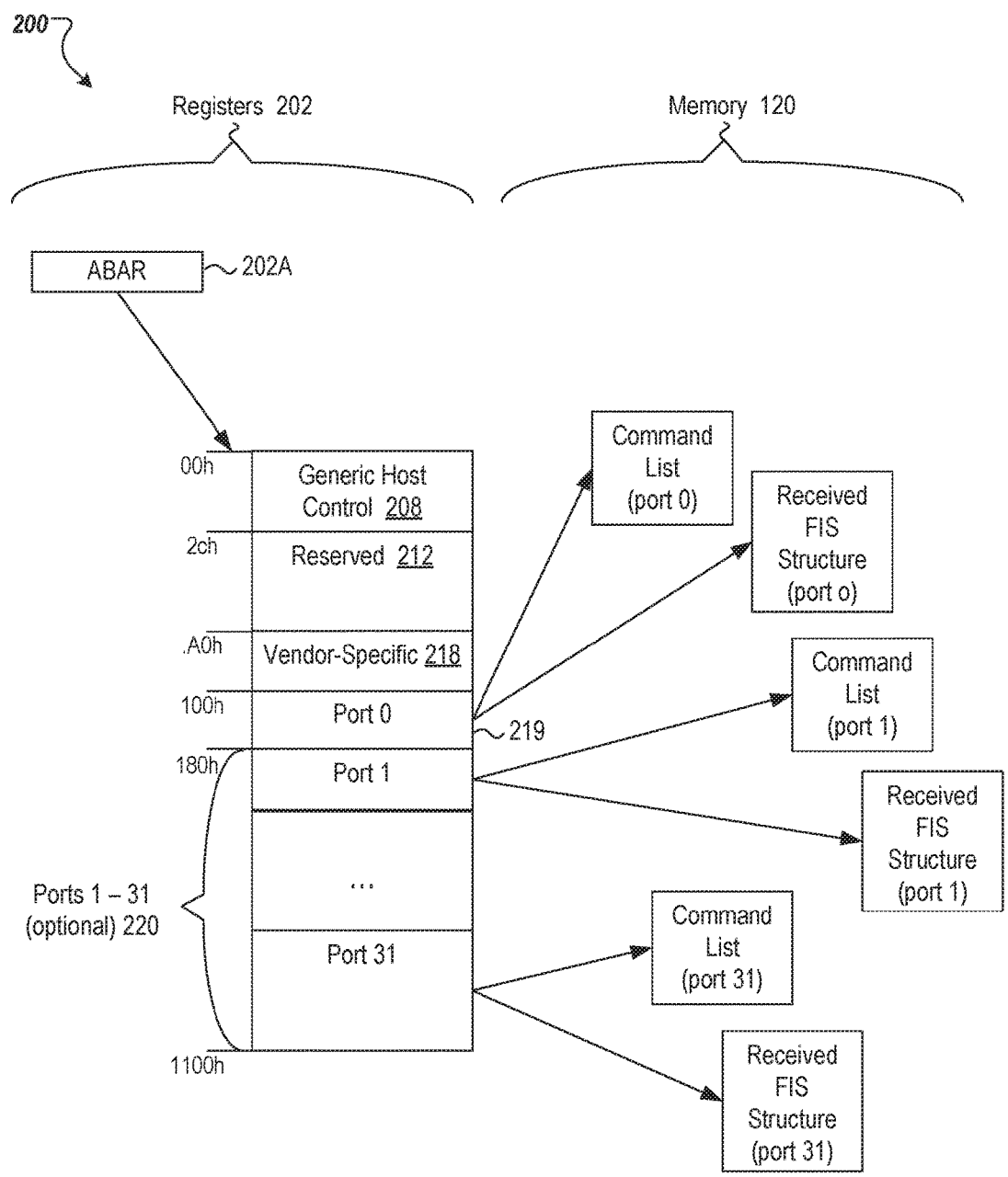
FIG. 2A is a block diagram of a memory controller including memory-mapped registers to provide memory-mapped input/output (I/O) capability within the computing device of FIG. 1A, according to one embodiment of the present disclosure.
Figure 2B:
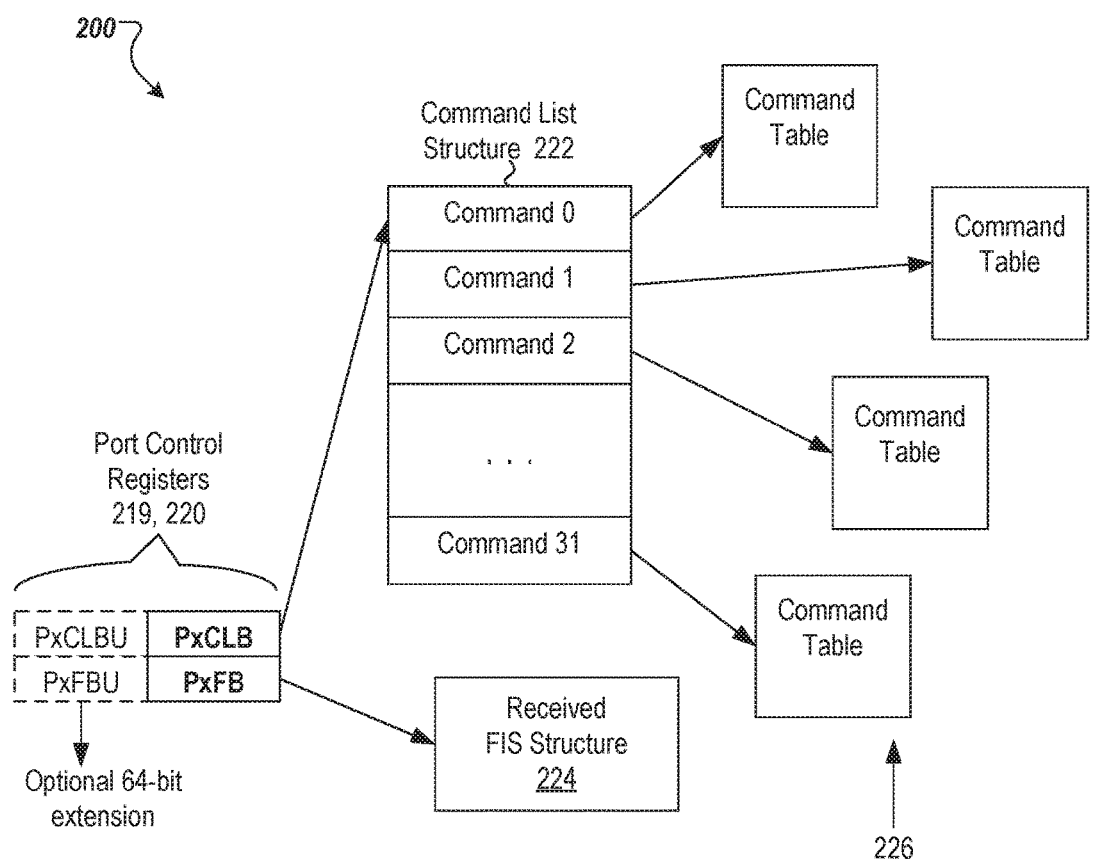
FIG. 2B is a block diagram of command-related, port system memory structures employed by the memory controller of FIG. 2A, according to an embodiment of the present disclosure.

FIG. 2A is a block diagram of an AHCI controller 200 including memory-mapped registers 202 to provide memory-mapped input/output (I/O) capability within the computing device 100 of FIG. 1A, according to one embodiment of the present disclosure. The memory-mapped registers 202 are also referred to in the art as HBA registers. The memory-mapped registers 202 may include, but not be limited to, AHCI base memory registers 202A, a generic host control register 208, a reserved set of registers 212, a set of vendor-specific registers 218, a port 0 control register 219, and a plurality of optional port control registers 220. Each port may be mapped to a command list and received frame information system (FIS) structure stored in the memory 120 (FIG. 2B).

The system hardware 102 communicates with the AHCI controller 200 through system memory 120 and the memory-mapped registers 202. The last PCI base address register (BAR[5], header offset 0x24) points to the AHCI base memory registers 202A, which is referred to as ABAR (AHCI Base Memory Register). The AHCI registers and memories can be located through ABAR. The other PCI base address registers act the same as a traditional IDE controller. The AHCI controller 200 can, therefore, be configured to simulate a legacy IDE controller.

An AHCI controller 200 can support up to 32 ports and as many hardware devices 150. The memory-mapped registers 202 can generally be divided into two parts, the generic host control registers 208 and the port control registers 219 and 220. The generic host control registers 208 control the behavior of the AHCI controller 200, while each port owns its own set of port control registers. The actual ports that the AHCI controller 200 supports and implements can be calculated from a capacity register (HBA_MEM.cap) and a port implemented register (HBA_MEM.pi) of the generic host control registers 208.

The area of the memory 120 corresponding to the memory-mapped registers 202 may be configured as uncacheable as the area may not be prefetchable random access memory (RAM). For the same reason, the data structures may be declared as "volatile" to prevent a compiler from over-optimizing code that generates commands to the AHCI controller 200.

FIG. 2B is a block diagram of command-related, port system memory structures employed by the AHCI controller 200 of FIG. 2A, according an embodiment of the present disclosure. The AHCI memory controller 200 may include the set of port control registers 219, 220, and may further include a command list structure 222, a received FIS structure 224, and a command table 226 for each command in the command list structure 222. A separate SATA device may be attached to each port. The system hardware 102 may send commands to the SATA device using a command list and the SATA device may deliver information to the system hardware 102 using the received FIS structure 224. These are located at HBA_PORT.cbl/clbu, and HBA_PORT.fb/fbu, respectively. These two pointers and the data structures they point to are set through AHCI initialization. When the virtual machine 140 sends a command to one of the ports 219 or 220 to direct a connected SATA device, the VMM 130 may generate a translated operation to translate the command between the virtualized operating system of the virtual machine 140 and the AHCI controller 200.

There may be at least four kinds of FIS which may be sent, using the received FIS structure 224, to the host by the hardware device 150. These include a direct memory access (DMA) setup FIS, a PIO setup FIS, a register-to-device host FIS, and a set device bit FIS. When an FIS has been copied into the host specified memory, an according bit may be set in the port interrupt status register (HBA_PORT.is) of the generic host control registers 208.

The system hardware 102, and thus any virtual device that the VMM 130 emulates, may send commands to the hardware device 150 through the command list stored in the command list structure 222. The command list may include one to 32 command headers, each one referred to as a "slot." Each command header may describe an ATA (AT Attachment) or ATAPI (AT Attachment Packet Interface) command, including a command FIS, an ATAPI command buffer and a plurality of Physical Region Descriptor Tables specifying the data payload address and size.

To send a command, the VMM 130 may construct a command header, and set an according bit in a Port Command Issue register (HBA_PORT.ci) of the AHCI controller 200. The AHCI controller 200 may then send the command to the hardware device 150 and wait for a response. If there is an error, error bits in the Port Interrupt register (HBA_PORT.is) may be set and additional information may be retrieved from the Port Task File register (HBA_PORT.tfd), SStatus register (HBA_PORT.ssts) and SError register (HBA_PORT.serr). If the command succeeds, the Command Issue register bit is cleared and the AHCI controller 200 may copy the received data payload, if any, from the hardware device 150 (SATA disk) to the memory 120.

The number of slots a Command List holds can be retrieved from the Host capability register (HBA_MEM.cap) of the generic host control registers 208. The slot may be within 1 and 32. SATA supports queued commands to increase throughput. Unlike traditional parallel ATA drive, a SATA drive can process a new command when an old one is still running. With AHCI, a host can send up to 32 commands to a hardware device 150 simultaneously.

Figure 3A:
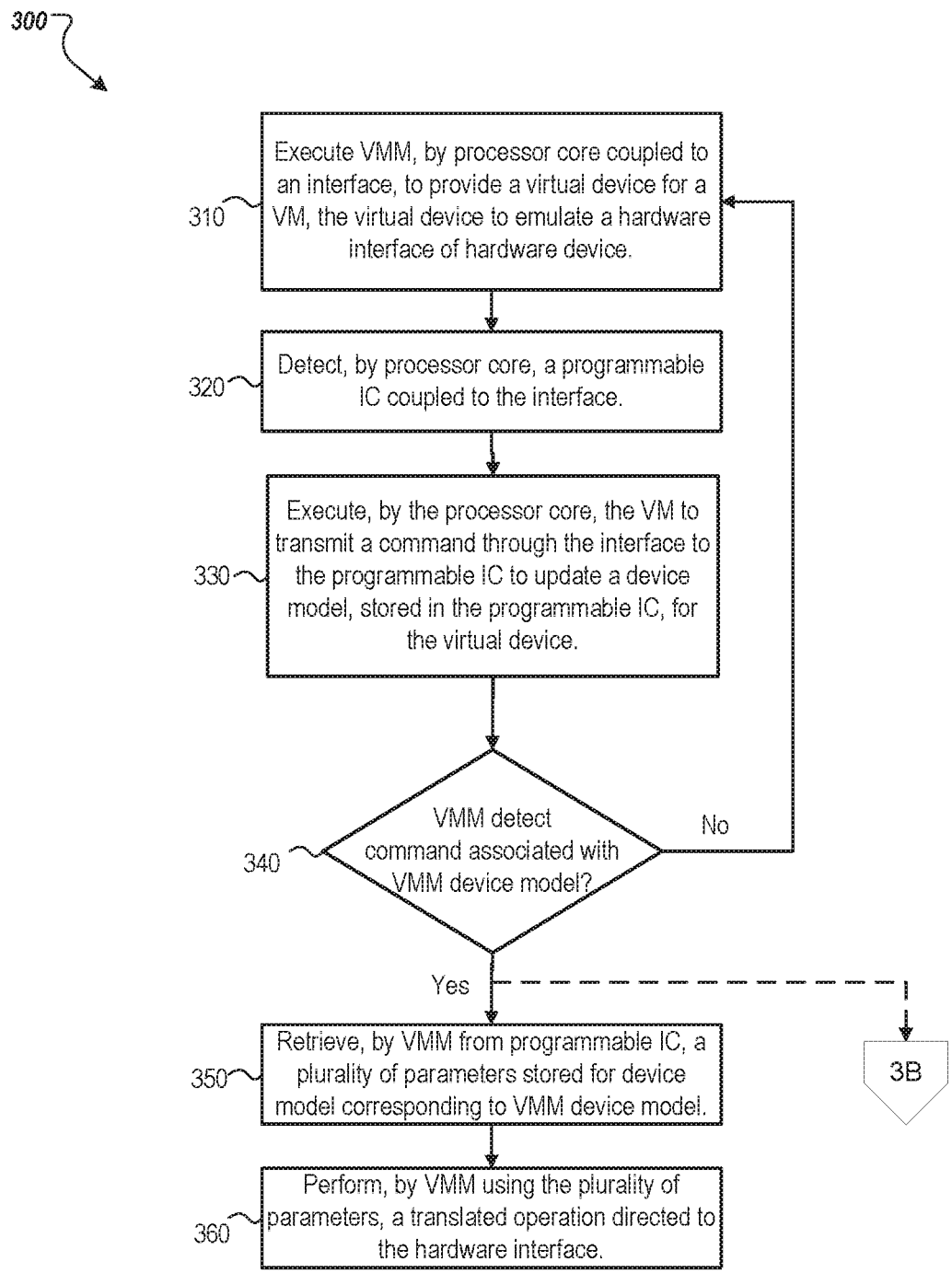
FIGS. 3A and 3B is a flow chart of a method for implementing device models for virtual machines with reconfigurable hardware, according to an embodiment of the present disclosure.
Figure 3B:
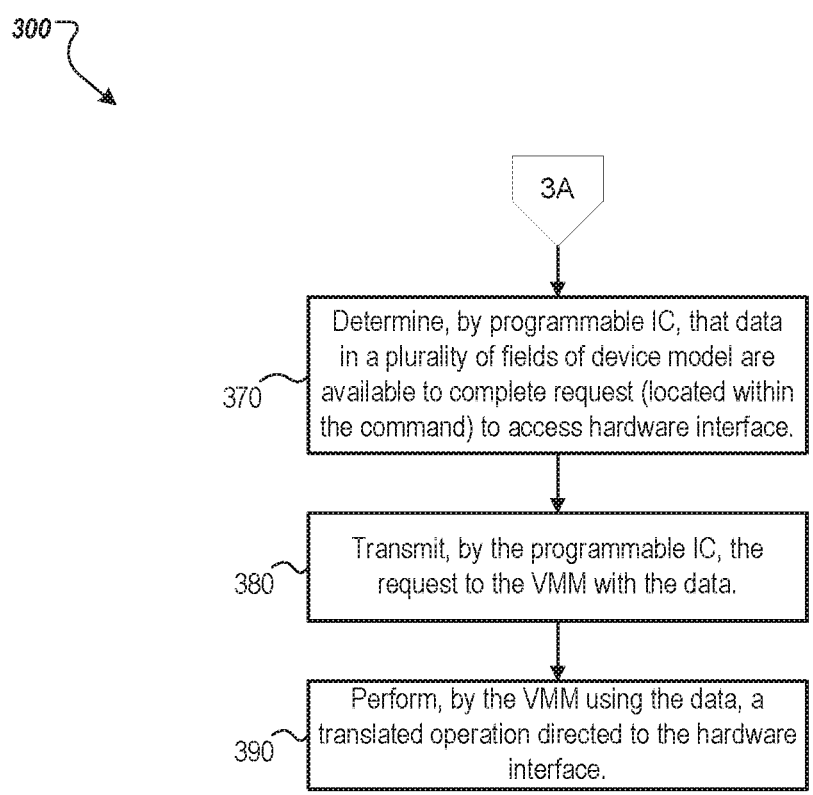

FIGS. 3A and 3B is a flow chart of a method 300 for implementing device models for virtual machines with reconfigurable hardware, according to an embodiment of the present disclosure. The method 300 may be performed by a system that may include hardware (e.g., circuitry, dedicated logic, and/or programmable logic), software (e.g., instructions executable on a computer system to perform hardware simulation), or a combination thereof. In an illustrative example, the method 300 may be performed by the system hardware 102 of the computing device 100 of FIGS. 1-2 or by the processor 106 of FIGS. 1-2. In one embodiment, the system hardware 102 execute the virtual machine monitor (VMM) 130 to perform aspects of the method 300 while the programmable IC 104 (and other invoked circuitry) of the processor 106 may perform other aspects of the method 300.

More specifically, referring to FIG. 3A, the method 300 may start with the processor core (which is coupled to an interface) executing the VMM to provide a virtual device for a virtual machine, the virtual device emulating a hardware interface of a hardware device (310). The method 300 may continue with the processor core detecting a programmable IC coupled to the interface (320). The method 300 may continue with the processor core executing the VM to transmit a command through the interface to the programmable IC to update a device model, stored in the programmable IC, for the virtual device (330). The method 300 may continue with determining whether the VMM detects a command associated with a VMM device model for the hardware interface (340).

If the VMM does not detect a command, the method 300 may continue with looping back to blocks 310-330 to continue updating the device model in the programmable IC in response to interactions between the virtual machine and the virtual device. If the VMM does detect a command targeted to the hardware interface, the method 300 may continue with one of two paths (where FIG. 3B describes the second). In a first path, the method 300 may continue with the VMM retrieving, from the programmable IC, a plurality of parameters (or data) stored for the device model corresponding to a VMM device model (350). In the above storage disk example, the virtual device is a virtual disk, the hardware device is a hard disk drive, the command is directed to a port of the hardware interface and includes a write command to a numbered sector of the virtual disk. In this example, the write command may include a plurality of parameters including one or more of: a number of sectors of the hard disk drive, a logical sector address, a physical memory address of data to be written, and a period of time for timeout before failure. The method may then continue with the VMM using the plurality of parameters (or data) to perform a translated operation directed to the hardware interface (360).

In a second option, illustrated in FIG. 3B, the method 300 may continue with the programmable IC determining that data in a plurality of fields of the device model are available to complete a request, located within the command, to access the hardware interface (370). The method 300 may continue with the programmable IC transmitting the request to the VMM with the data (e.g., with the data in a descriptor file or the like) (380). The method 300 may continue with the VMM performing, using the data, a translated operation direct to the hardware interface (390).

Accordingly, the interface of the processor 106 may be a means for coupling to the programmable IC 104. The processor 106 executing the VMM 130 may be a means for transmitting a command through the interface to the programmable IC 104 to update a device model 176 for the virtual device stored in the programmable IC 104. The processor 106 executing the VMM 130 may also be a means by which the VMM 130 detects a command associated with the VMM device model 174, which in one embodiment may take the path of blocks 350 and 360. In another embodiment, the programmable IC 104 may be the means by which blocks 370 and 380 are performed. In either case, the processor 106 executing the VMM 130 may be the means for performing a translated operation direct to the hardware interface 152 using data from the device model 176 stored in the programmable IC 104.

FIG. 4A is a block diagram illustrating a micro-architecture for a processor 400 that may be used to implement a device model for a virtual machine with reconfigurable hardware. Specifically, processor 400 depicts an in-order architecture core and a register renaming logic, out-of-order issue/execution logic to be included in a processor according to at least one embodiment of the disclosure. The embodiments of translation on entry to a virtual machine can be implemented in the processor 400.

Processor 400 includes a front end unit 430 coupled to an execution engine unit 450, and both are coupled to a memory unit 470. The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one embodiment, processor 400 may be a multi-core processor or may be part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher 480, a data TLB unit 472, a data cache unit (DCU) 474, and a level 2 (L2) cache unit 476, to name a few examples. In some embodiments DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one embodiment, the data prefetcher 480 speculatively loads/prefetches data to the DCU 474 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor. Note that instruction cache unit 434, data cache unit 474, and L2 cache unit 476 would not generally implement the process described in this disclosure, as generally these cache units use on-die memory that does not exhibit page-locality behavior.

FIG. 4B is a block diagram illustrating an in-order pipeline 401 and a register renaming stage, out-of-order issue/execution pipeline 403 implemented by processor 400 of FIG. 4A according to some embodiments of the disclosure. The solid lined boxes in FIG. 4B illustrate an in-order pipeline 401, while the dashed lined boxes illustrate a register renaming, out-of-order issue/execution pipeline 403. In FIG. 4B, pipelines 401 and 403 include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 420, and a commit stage 422. In some embodiments, the ordering of stages 402-422 may be different than illustrated and are not limited to the specific ordering shown in FIG. 4B.

Figure 5:
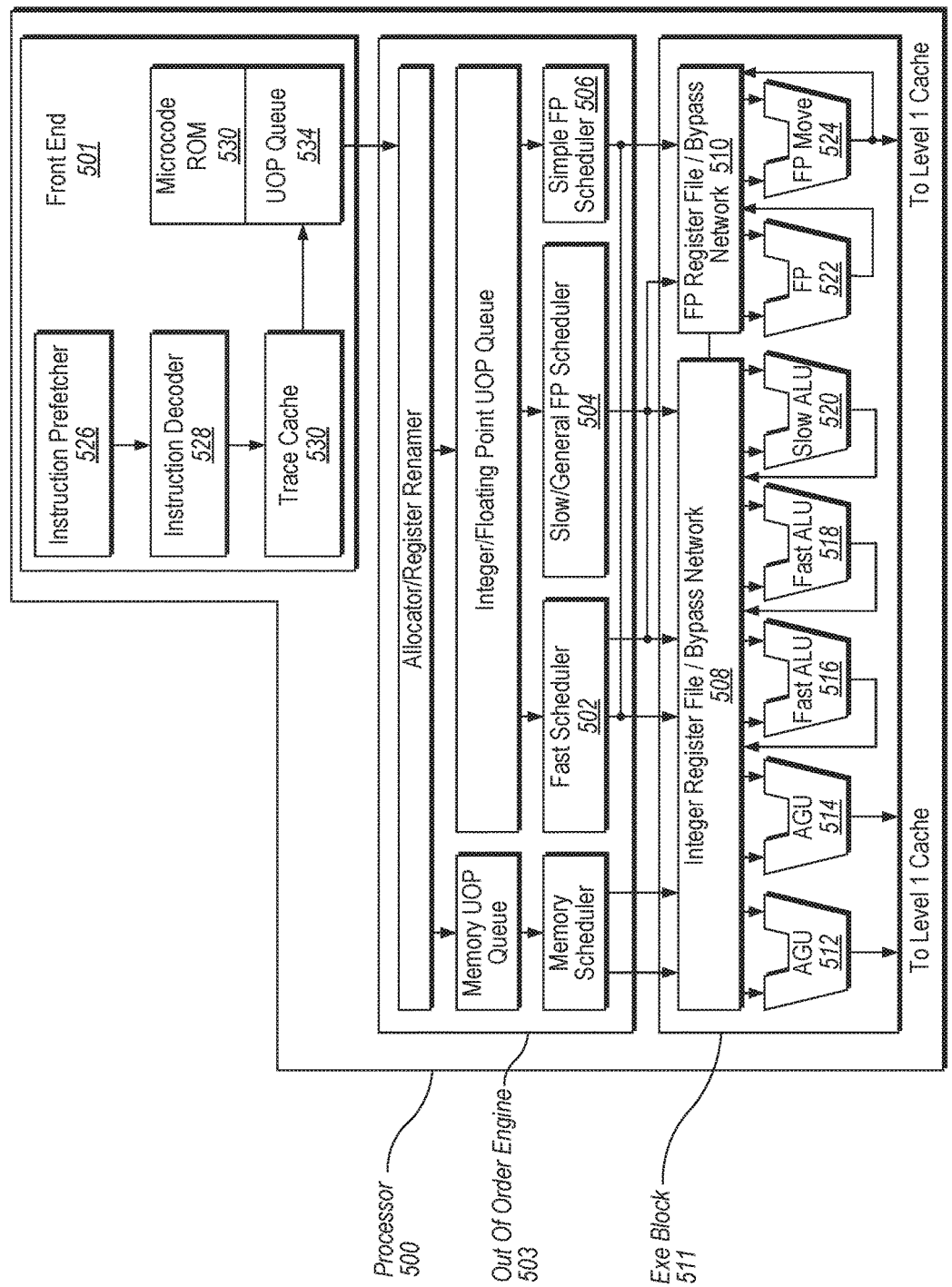
FIG. 5 illustrates a block diagram of the micro-architecture for a processor that includes logic circuits to interface with reconfigurable hardware to implement a device model for a virtual machine.

FIG. 5 illustrates a block diagram of the micro-architecture for a processor 500 that includes logic circuits that may be used to implement a device model for a virtual machine with reconfigurable hardware, according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline. The embodiments of the page additions and content copying can be implemented in processor 500.

The front end 501 may include several units. In one embodiment, the instruction prefetcher 516 fetches instructions from memory and feeds them to an instruction decoder 518 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, microcode ROM (or RAM) 532 provides the uops needed to complete the operation.

Some instructions are converted into a single micro-op, whereas others need several micro-ops to complete the full operation. In one embodiment, if more than four micro-ops are needed to complete an instruction, the decoder 518 accesses the microcode ROM 532 to do the instruction. For one embodiment, an instruction can be decoded into a small number of micro ops for processing at the instruction decoder 518. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is comprised of a number of execution units: address generation unit (AGU) 512, AGU 514, fast ALU 516, fast ALU 518, slow ALU 520, floating point ALU 512, floating point move unit 514. For one embodiment, the floating point execution blocks 512, 514, execute floating point, MMX, SIMD, and SSE, or other operations. The floating point ALU 512 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 522, 524. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
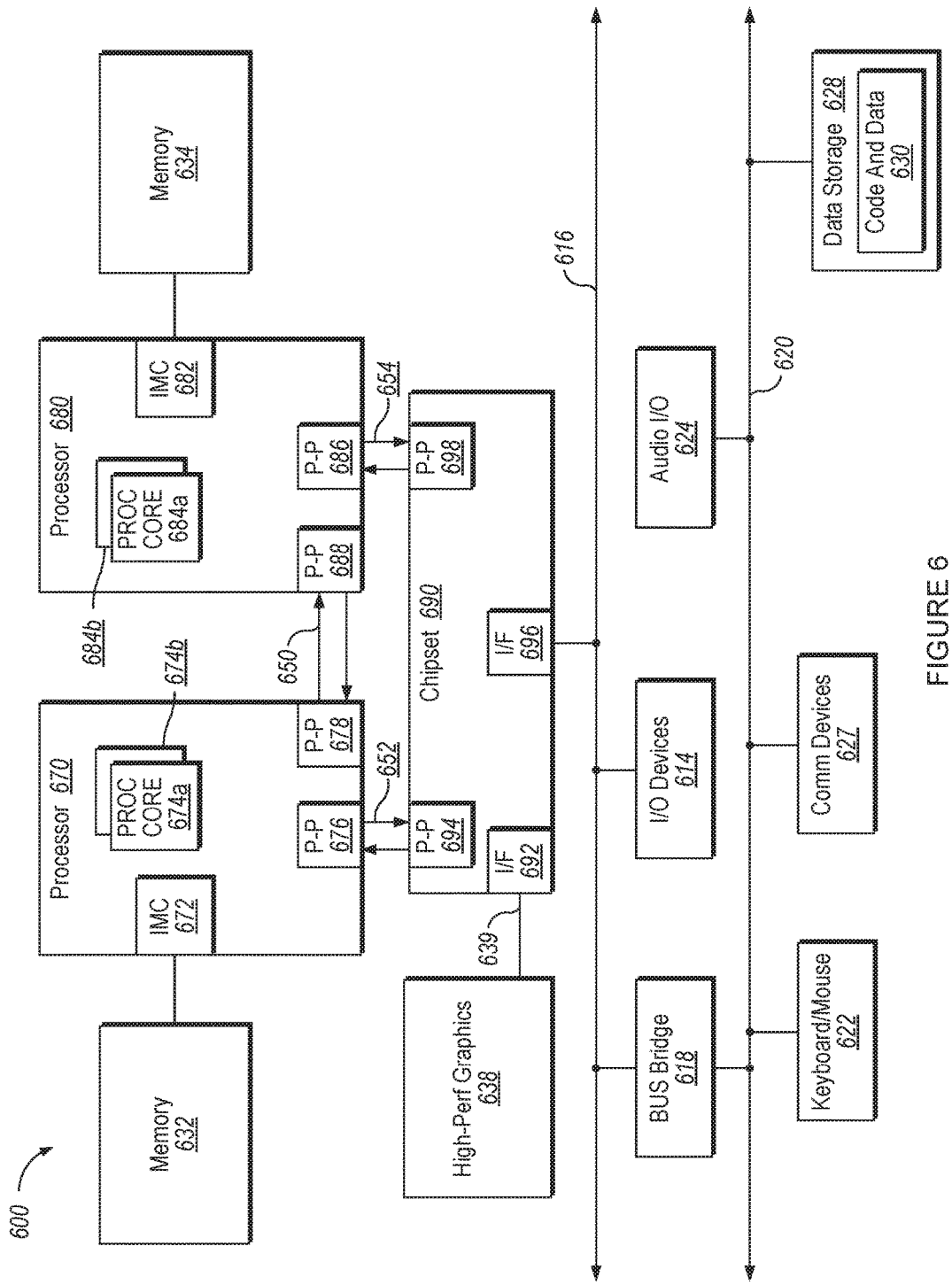
FIG. 6 is a block diagram of a computer system according to one implementation.

Embodiments may be implemented in many different system types. Referring now to FIG. 6, shown is a block diagram of a multiprocessor system 600 in accordance with an implementation. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors.

While shown with two processors 670, 680, it is to be understood that the scope of the present disclosure is not so limited. In other implementations, one or more additional processors may be present in a given processor.

Processors 670 and 680 are shown including integrated memory controller units 672 and 682, respectively. Processor 670 also includes as part of its bus controller units point-to-point (P-P) interfaces 676 and 688; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode. Page locality may also be created in the shared cache across one or more cache controllers when allocating entries to the shared cache.

Chipset 690 may be coupled to a first bus 616 via an interface 696. In one embodiment, first bus 616 may be a Peripheral Component Interconnect (PCI) bus, or a bus such as a PCI Express bus or interconnect bus, although the scope of the present disclosure is not so limited.

Figure 7:
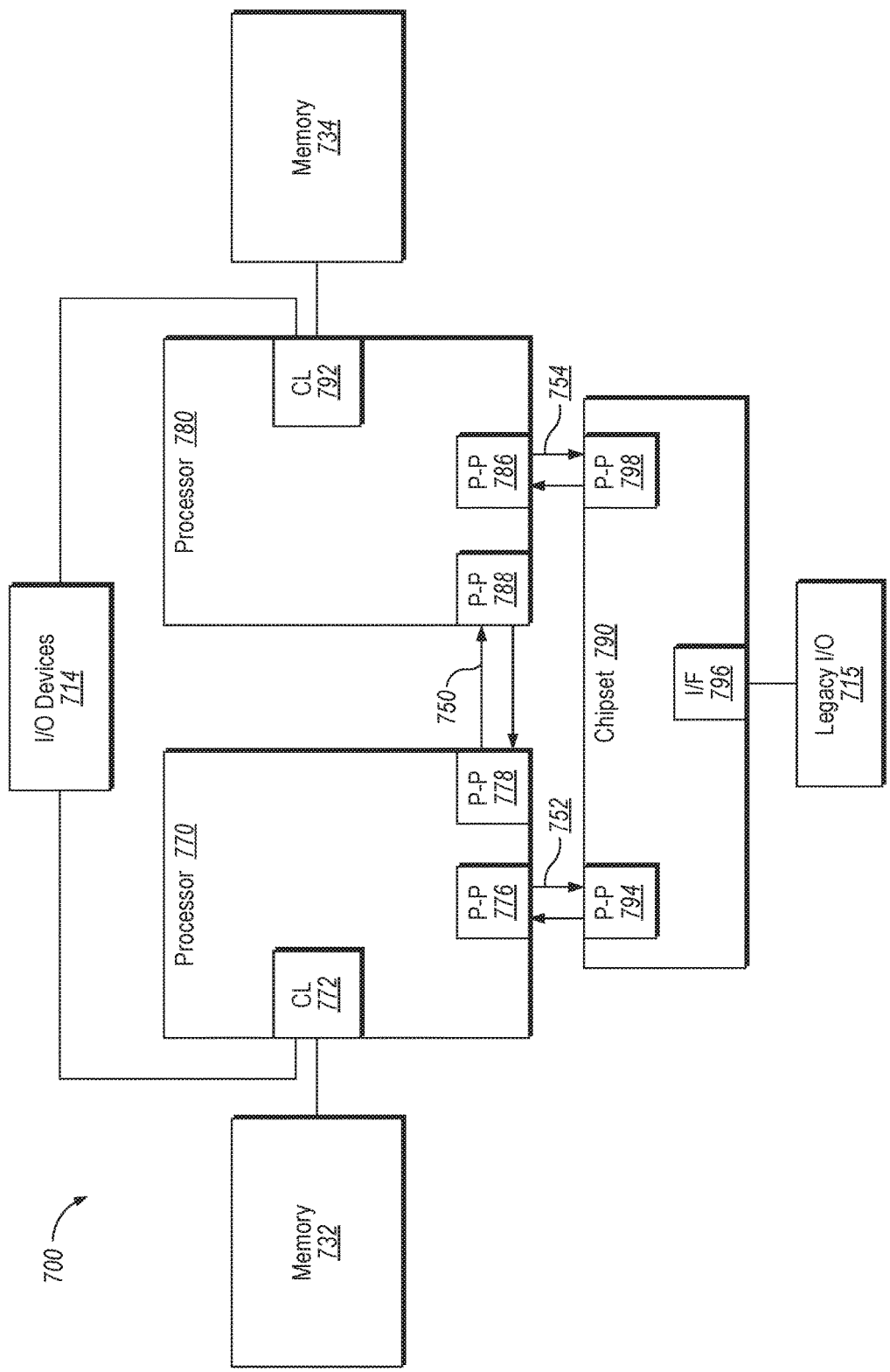
FIG. 7 is a block diagram of a computer system according to another implementation.

Referring now to FIG. 7, shown is a block diagram of a third system 700 in accordance with an embodiment of the present disclosure. Like elements in FIGS. 6 and 7 bear like reference numerals, and certain aspects of FIG. 7 have been omitted from FIG. 6 in order to avoid obscuring other aspects of FIG. 7.

FIG. 7 illustrates that the processors 770, 780 may include integrated memory and I/O control logic ("CL") 772 and 792, respectively. For at least one embodiment, the CL 772, 782 may include integrated memory controller units such as described herein. In addition. CL 772, 792 may also include I/O control logic. FIG. 7 illustrates that the memories 732, 734 are coupled to the CL 772, 792, and that I/O devices 714 are also coupled to the control logic 772, 792. Legacy I/O devices 715 are coupled to the chipset 790.

Figure 8:
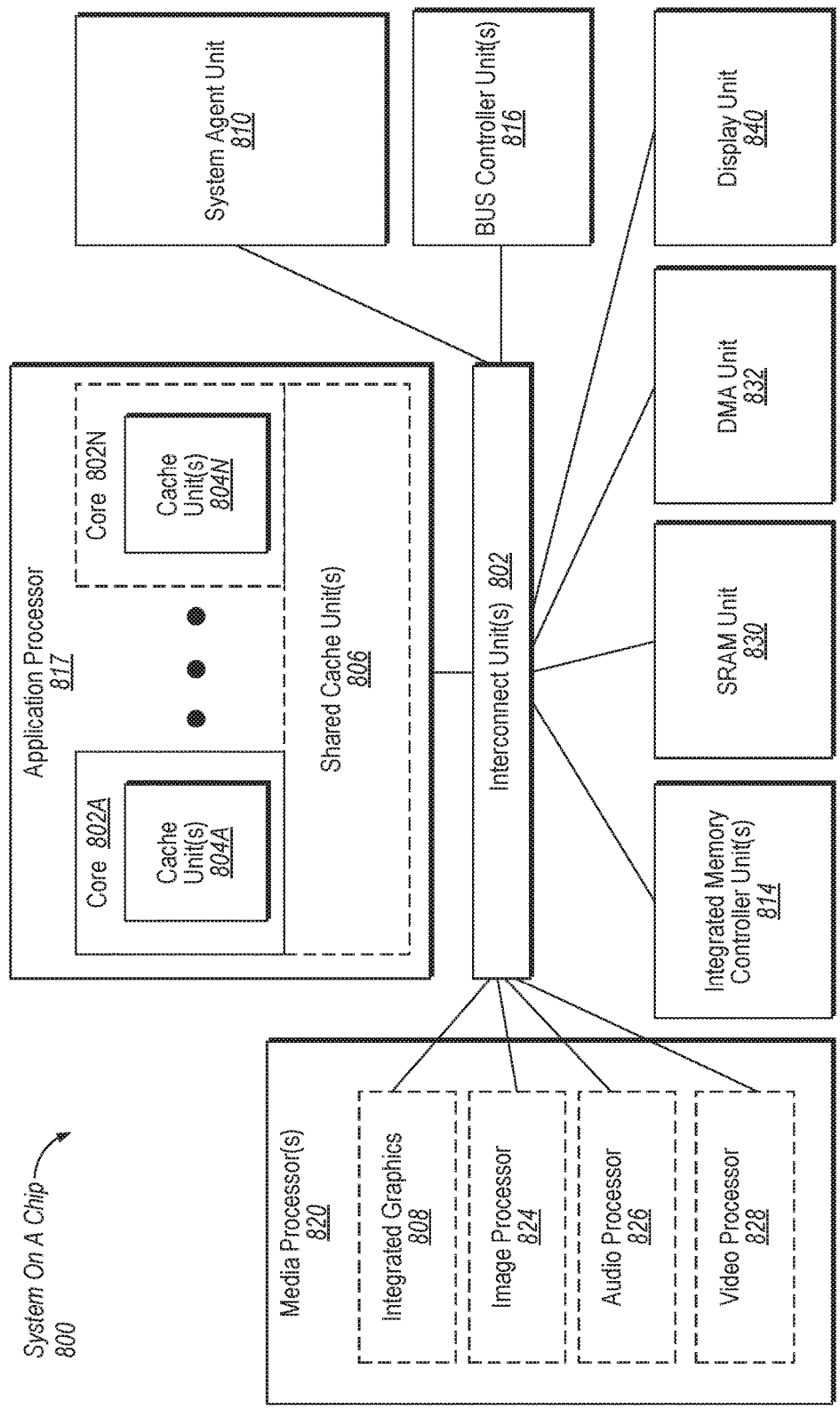
FIG. 8 is a block diagram of a system-on-a-chip according to one implementation.

FIG. 8 is an exemplary system on a chip (SoC) 800 that may include one or more of the cores 802. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 800 of FIG. 8, dashed lined boxes are features on more advanced SoCs. An interconnect unit(s) 802 may be coupled to: an application processor 817 which includes a set of one or more cores 802A-N and shared cache unit(s) 806; a system agent unit 810; a bus controller unit(s) 816; an integrated memory controller unit(s) 814; a set of one or more media processors 820 which may include integrated graphics logic 808, an image processor 824 for providing still and/or video camera functionality, an audio processor 826 for providing hardware audio acceleration, and a video processor 828 for providing video encode/decode acceleration; a static random access memory (SRAM) unit 830; a direct memory access (DMA) unit 832; and a display unit 840 for coupling to one or more external displays.

Figure 9:
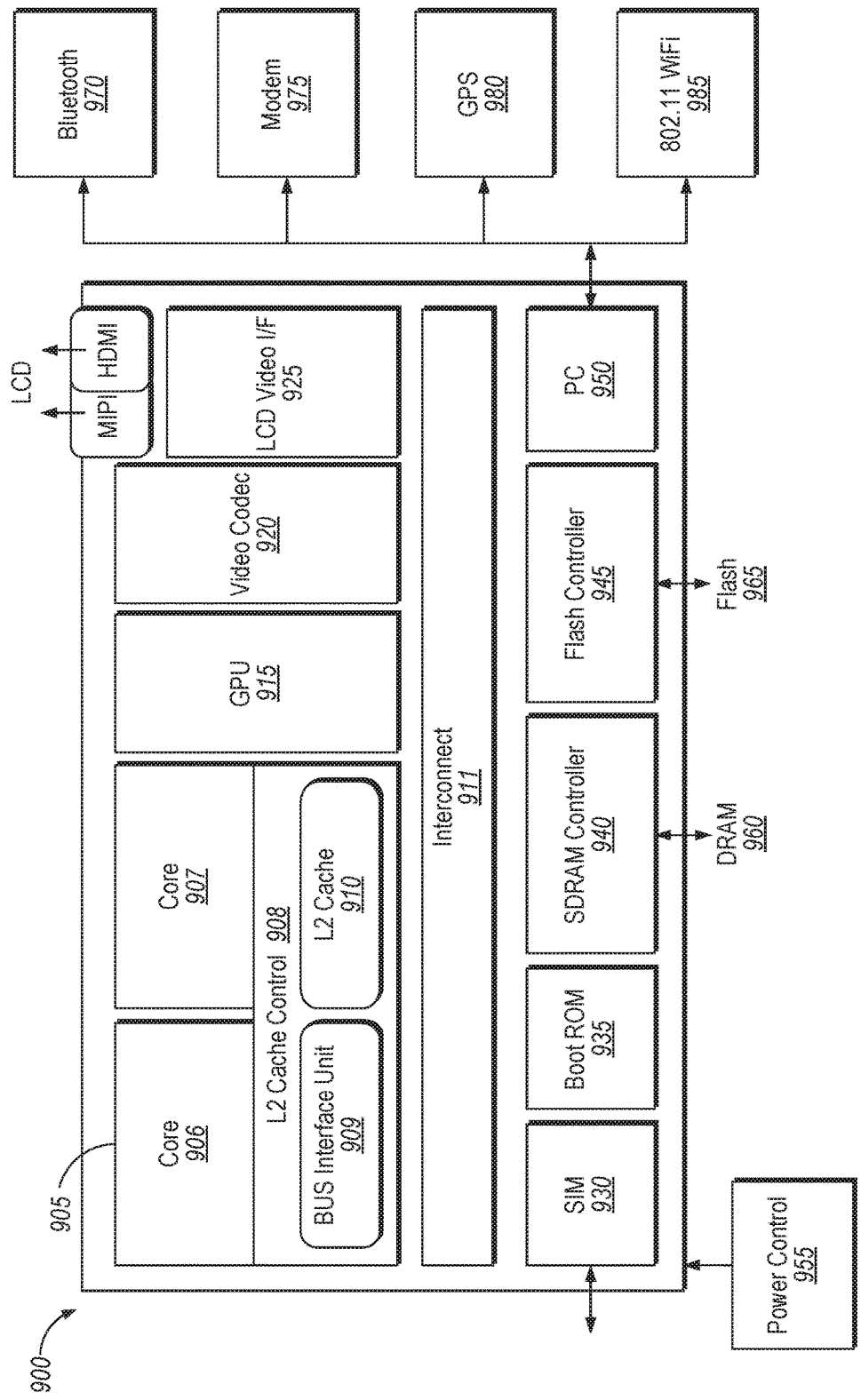
FIG. 9 illustrates another implementation of a block diagram for a computing system.

Turning next to FIG. 9, an embodiment of a system on-chip (SoC) design in accordance with embodiments of the disclosure is depicted. As an illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 900.

Here, SoC 900 includes 2 cores—906 and 907. Similar to the discussion above, cores 906 and 907 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 911 includes an on-chip interconnect, such as an IOSF, AMBA, or other interconnects discussed above, which can implement one or more aspects of the described disclosure.

In one embodiment, SDRAM controller 940 may connect to interconnect 911 via cache 910. Interconnect 911 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the embodiments described herein.

In addition, the system illustrates peripherals for communication, such as a Bluetooth® module 970, 3G modem 975, GPS 980, and Wi-Fi® 985. Note as stated above, a UE includes a radio for communication. As a result, these peripheral communication modules may not all be included. However, in a UE some form of a radio for external communication should be included.

Figure 10:
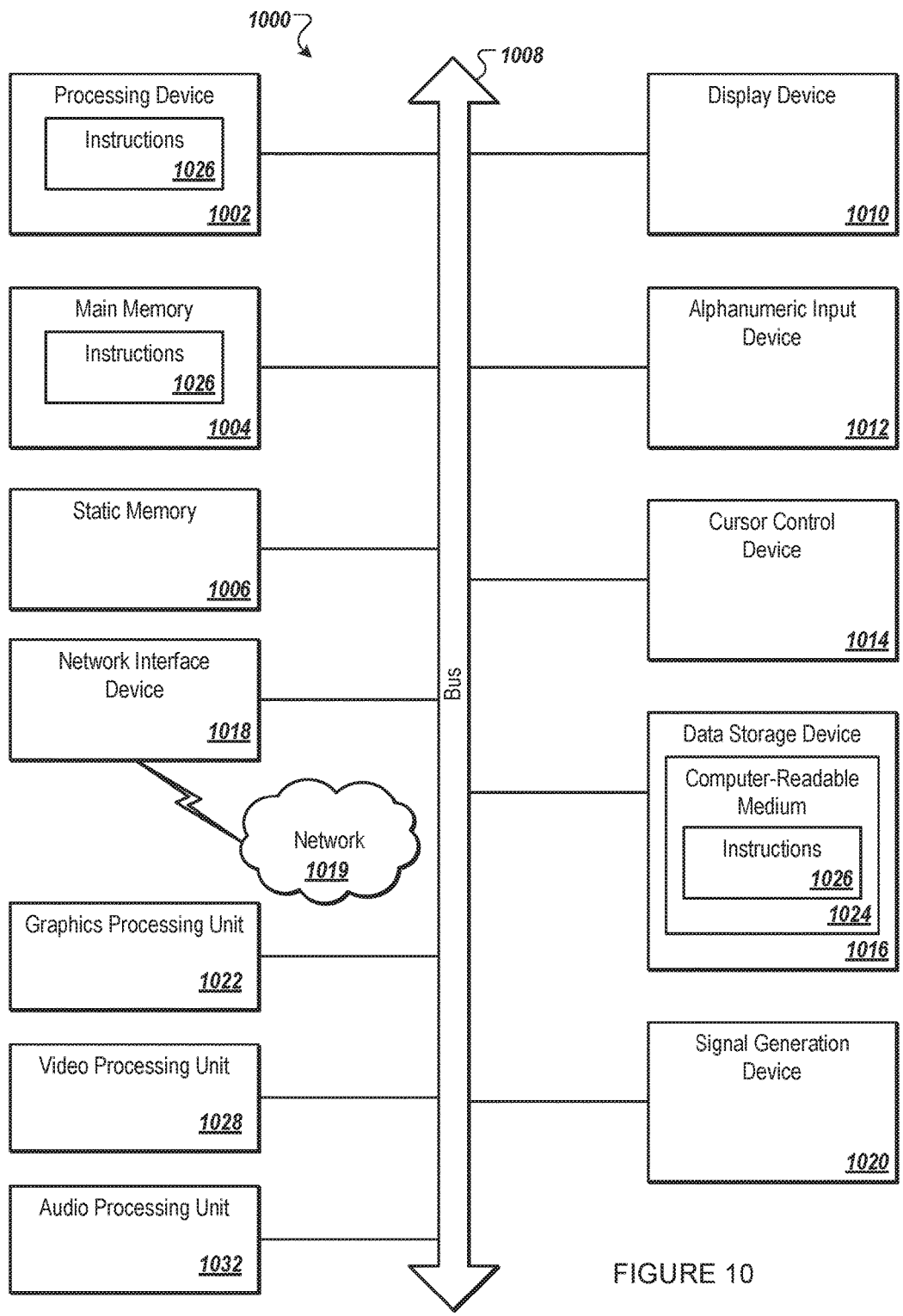
FIG. 10 illustrates another implementation of a block diagram for a computing system.

FIG. 10 illustrates a diagrammatic representation of a machine in the example form of a computing system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1000.

The computing system 1000 includes a processing device 1002, main memory 1004 (e.g., flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1008.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application-specific integrated circuit (ASIC), a field programmable gate array (FPGA), a digital signal processor (DSP), network processor, or the like. In one embodiment, processing device 1002 may include one or more processor cores. The processing device 1002 is configured to execute the processing logic 1026 for performing the operations discussed herein.

In one embodiment, processing device 1002 can be part of the computing system 100 of FIG. 1. Alternatively, the computing system 1000 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that the physical core is simultaneously multithreading), or a combination thereof (e.g., time sliced fetching and decoding and simultaneous multithreading thereafter such as in the Intel® Hyperthreading technology).

The computing system 1000 may further include a network interface device 1018 communicably coupled to a network 1019. The computing system 1000 also may include a video display device 1010 (e.g., a liquid crystal display (LCD) or a cathode ray tube (CRT)), an alphanumeric input device 1010 (e.g., a keyboard), a cursor control device 1014 (e.g., a mouse), a signal generation device 1020 (e.g., a speaker), or other peripheral devices. Furthermore, computing system 1000 may include a graphics processing unit 1022, a video processing unit 1028 and an audio processing unit 1032. In another embodiment, the computing system 1000 may include a chipset (not illustrated), which refers to a group of integrated circuits, or chips, that are designed to work with the processing device 1002 and controls communications between the processing device 1002 and external devices. For example, the chipset may be a set of chips on a motherboard that links the processing device 1002 to very high-speed devices, such as main memory 1004 and graphic controllers, as well as linking the processing device 1002 to lower-speed peripheral buses of peripherals, such as USB, PCI or ISA buses.

The data storage device 1018 may include a computer-readable storage medium 1024 on which is stored software 1026 embodying any one or more of the methodologies of functions described herein. The software 1026 may also reside, completely or at least partially, within the main memory 1004 as instructions 1026 and/or within the processing device 1002 as processing logic during execution thereof by the computing system 1000; the main memory 1004 and the processing device 1002 also constituting computer-readable storage media.

The computer-readable storage medium 1024 may also be used to store instructions 1026 utilizing the processing device 1002, such as described with respect to FIGS. 1 and 2, and/or a software library containing methods that call the above applications. While the computer-readable storage medium 1024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) an interface coupled to a programmable integrated circuit (IC); and 2) a processor core coupled to the interface and to execute a virtual machine monitor (VMM), the VMM to provide a virtual device for a virtual machine (VM), wherein the virtual device emulates a hardware interface of a hardware device, wherein the processor core is further to execute the VM to transmit a command through the interface to the programmable IC to update a device model, stored in the programmable IC, for the virtual device.

In Example 2, the processor of Example 1, wherein the programmable IC is a field-programmable gate array (FPGA).

In Example 3, the processor of Example 1, wherein the command comprises a request for access to a port of the hardware interface, and wherein the VMM is further to: a) receive the request from the programmable IC, the request including a plurality of parameters of the device model needed to fulfill the request; and b) perform, using the plurality of parameters, a translated operation directed to the port of the hardware interface.

In Example 4, the processor of Example 3, wherein the translated operation is a virtual input/output (IO) operation to set up a physical IO operation through the port of the hardware interface.

In Example 5, the processor of Example 3, wherein the hardware interface comprises a host bus adapter.

In Example 6, the processor of Example 1, wherein the VMM is further to: a) detect the command associated with a VMM device model, the VMM device model corresponding to the device model stored in the programmable IC; b) retrieve, from the programmable IC, a plurality of parameters stored for the device model; and c) perform, using the plurality of parameters, a translated operation directed to the hardware interface.

In Example 7, the processor of Example 1, wherein the virtual device is a virtual disk, wherein the hardware device is a hard disk drive, wherein the command is directed to a port of the hardware interface and comprises a write command to a numbered sector of the virtual disk, and wherein the write command comprises a plurality of parameters comprising one or more of: a number of sectors, a logical sector address, a physical memory address of data to be written, or a period of time for timeout before failure.

Various embodiments may have different combinations of the structural features described above. For instance, all optional features of the computing system described above may also be implemented with respect to the method or process described herein and specifics in the examples may be used anywhere in one or more embodiments.

Example 8 is a system comprising: 1) a programmable integrated circuit (IC) to store and execute a device model; and 2) a processor coupled to the programmable IC, the processor to: a) execute a virtual machine monitor (VMM), the VMM to provide a virtual device for a virtual machine (VM), wherein the virtual device emulates a hardware interface of a hardware device; and b) execute the VM to transmit a command to the programmable IC to update the device model for the virtual device; and wherein the programmable IC is to: c) retrieve a plurality of parameters from the command; and d) update a field of the device model with a corresponding parameter of the plurality of parameters.

In Example 9, the system of Example 8, wherein the programmable IC is a programmable Application-Specific Integrated Circuit (ASIC).

10. The system of Example 8, wherein the command comprises a request to access the virtual device for access to the hardware interface, and wherein the programmable IC is further to: a) detect the command; b) determine that data in a plurality of fields of the device model are available to complete the request; and c) transmit the request, which includes the data, to the VMM to perform a translated operation.

In Example 11, the system of Example 10, wherein the VMM is further to perform, using the data, the translated operation directed to the hardware interface.

In Example 12, the system of Example 10, wherein the translated operation is a virtual input/output (IO) operation to set up a physical IO operation through a port of the hardware interface.

In Example 13, the system of Example 10, wherein the hardware interface comprises a host bus adapter.

In Example 14, the system of Example 8, wherein the VMM is further to: a) detect the command associated with a VMM device model, the VMM device model corresponding to the device model stored in the programmable IC; b) retrieve, from the programmable IC, a plurality of parameters stored for the device model; and c) perform, using the plurality of parameters, a translated operation directed to the hardware interface.

In Example 15, the system of Example 8, wherein the virtual device is a virtual disk, the hardware device is a hard disk drive, the command is directed to a port of the hardware interface and comprises a write command to a numbered sector of the virtual disk, and wherein the write command comprises a plurality of parameters comprising one or more of: a number of sectors, a logical sector address, a physical memory address of data to be written, or a period of time for timeout before failure.

Various embodiments may have different combinations of the structural features described above. For instance, all optional features of the processors and methods described above may also be implemented with respect to a system described herein and specifics in the examples may be used anywhere in one or more embodiments.

Example 16 is a method comprising: a) executing, by a processor core coupled to an interface, a virtual machine monitor (VMM), the VMM to provide a virtual device for a virtual machine (VM), wherein the virtual device emulates a hardware interface of a hardware device; b) detecting, by the processor core, a programmable integrated circuit (IC) coupled to the interface; and c) executing, by the processor core, the VM to transmit a command through the interface to the programmable IC to update a device model, stored in the programmable IC, for the virtual device.

In Example 17, the method of Example 16, further comprising: a) retrieving, by the programmable IC, a plurality of parameters from the command; and b) updating, by the programmable IC, a field of the device model with a corresponding parameter of the plurality of parameters.

In Example 18, the method of Example 16, wherein the command comprises a request to access the virtual device requiring access to the hardware interface, the method further comprising: a) detecting the command; b) determining, by the programmable IC, that data in a plurality of fields of the device model are available to complete the request; c) transmitting, by the programmable IC, the request to the VMM, the request including the data; and d) performing, by the processor core executing the VMM and using the data, a translated operation directed to the hardware interface.

In Example 19, the method of Example 18, wherein the translated operation is a virtual input/output (IO) operation to set up a physical IO operation through a port of the hardware interface.

In Example 20, the method of Example 16, further comprising: a) detecting, by the VMM, the command associated with a VMM device model, the VMM device model corresponding to the device model stored in the programmable IC; b) retrieving, by the VMM, from the programmable IC, a plurality of parameters stored for the device model; and c) performing, by the VMM using the plurality of parameters, a translated operation directed to the hardware interface.

Various embodiments may have different combinations of the structural features described above. For instance, all optional features of the processors and methods described above may also be implemented with respect to a system described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a first hardware interface coupled to a programmable integrated circuit (IC);
   a processor core coupled to the first hardware interface and to execute a virtual machine monitor (VMM), the VMM to provide a virtual device for a virtual machine (VM), wherein the virtual device emulates a second hardware interface of a hardware device that is coupled to the processor core, wherein the processor core is further to execute the VM to transmit a command through the first hardware interface to the programmable IC to update a device model, stored in the programmable IC, for the virtual device; and wherein the processor core is further to execute the VMM to detect the command associated with a VMM device model, the VMM device model corresponding to the device model stored in the programmable IC;

retrieve, from the programmable IC, a plurality of parameters stored for the device model; and perform, using the plurality of parameters, a translated operation directed to the second hardware interface.

2. The processor of claim 1, wherein the programmable IC is a field-programmable gate array (FPGA).

3. The processor of claim 1, wherein the command comprises a request for access to a port of the second hardware interface, and wherein the VMM is further to:

receive the request from the programmable IC, the request including a plurality of parameters of the device model needed to fulfill the request; and perform, using the plurality of parameters, the translated operation directed to the port of the second hardware interface.

4. The processor of claim 3, wherein the translated operation is a virtual input/output (TO) operation to set up a physical TO operation through the port of the second hardware interface.

5. The processor of claim 3, wherein the second hardware interface comprises a host bus adapter.

6. The processor of claim 1, wherein the virtual device is a virtual disk, wherein the hardware device is a hard disk drive, wherein the command is directed to a port of the second hardware interface and comprises a write command to a numbered sector of the virtual disk, and wherein the write command comprises a plurality of parameters comprising one or more of: a number of sectors, a logical sector address, a physical memory address of data to be written, or a period of time for timeout before failure.

7. A system comprising:

a programmable integrated circuit (IC) to store and execute a device model; and a processor coupled to the programmable IC, the processor to:

execute a virtual machine monitor (VMM), the VMM to provide a virtual device for a virtual machine (VM), wherein the virtual device emulates a hardware interface of a hardware device; and execute the VM to transmit a command to the programmable IC to update the device model for the virtual device;

wherein the processor is further to execute the VMM to:

detect the command associated with a VMM device model, the VMM device model corresponding to the device model stored in the programmable IC;

retrieve, from the programmable IC, a plurality of parameters stored for the device model; and perform, using the plurality of parameters, a translated operation directed to the hardware interface.

8. The system of claim 7, wherein the programmable IC is a programmable Application-Specific Integrated Circuit (ASIC).

9. The system of claim 7, wherein the command comprises a request to access the virtual device for access to the hardware interface, and wherein the programmable IC is to:

detect the command;

determine that data in a plurality of fields of the device model are available to complete the request; and transmit the request, which includes the data, to the VMM to perform the translated operation.

10. The system of claim 9, wherein the VMM is further to perform, using the data, the translated operation directed to the hardware interface.

11. The system of claim 9, wherein the translated operation is a virtual input/output (TO) operation to set up a physical TO operation through a port of the hardware interface.

12. The system of claim 9, wherein the hardware interface comprises a host bus adapter.

13. The system of claim 7, wherein the programmable IC is to:

retrieve the plurality of parameters from the command; and update a field of the device model with a corresponding parameter of the plurality of parameters.

14. The system of claim 7, wherein the virtual device is a virtual disk, the hardware device is a hard disk drive, the command is directed to a port of the hardware interface and comprises a write command to a numbered sector of the virtual disk, and wherein the write command comprises the plurality of parameters comprising one or more of: a number of sectors, a logical sector address, a physical memory address of data to be written, or a period of time for timeout before failure.

15. A method comprising:

executing, by a processor core coupled to a first hardware interface, a virtual machine monitor (VMM), the VMM to provide a virtual device for a virtual machine (VM), wherein the virtual device emulates a second hardware interface of a hardware device;

detecting, by the processor core, a programmable integrated circuit (IC) coupled to the interface;

executing, by the processor core, the VM to transmit a command through the first hardware interface to the programmable IC to update a device model, stored in the programmable IC, for the virtual device;

detecting, by the VMM, the command associated with a VMM device model, the VMM device model corresponding to the device model stored in the programmable IC;

retrieving, by the VMM, from the programmable IC, a plurality of parameters stored for the device model; and performing, by the VMM using the plurality of parameters, a translated operation directed to the second hardware interface.

16. The method of claim 15, further comprising:

retrieving, by the programmable IC, the plurality of parameters from the command; and updating, by the programmable IC, a field of the device model with a corresponding parameter of the plurality of parameters.

17. The method of claim 15, wherein the command comprises a request to access the virtual device requiring access to the second hardware interface, the method further comprising:

detecting the command;

determining, by the programmable IC, that data in a plurality of fields of the device model are available to complete the request;

transmitting, by the programmable IC, the request to the VMM, the request including the data; and performing, by the processor core executing the VMM and using the data, the translated operation directed to the second hardware interface.

18. The method of claim 17, wherein the translated operation is a virtual input/output (TO) operation to set up a physical IO operation through a port of the second hardware interface.

* * * * *